UNITED STATES PATENT OFFICE.

MELCHIOR BÖNIGER, OF BASEL, SWITZERLAND, ASSIGNOR TO CHEMISCHE FABRIK VORMALS SANDOZ, OF BASEL, SWITZERLAND, A CORPORATION OF SWITZERLAND.

DARK-BLUE MONOAZO DYESTUFFS.

1,014,039.  Specification of Letters Patent.  Patented Jan. 9, 1912.

Application filed June 8, 1911. Serial No. 631,892.

*To all whom it may concern:*

Be it known that I, MELCHIOR BÖNIGER, a citizen of the Swiss Republic, residing in Basel, Switzerland, have invented certain new and useful Improvements in the Manufacture of Dark-Blue Monoazo Dyestuffs, of which the following is a specification.

My invention relates to the manufacture of dark blue monoazo dyestuffs by combining the monobromnaphthalene-1-diazo-2-oxid-4-sulfonic acid, described in my application for Letters Patent, Serial No. 631,893 of the same day, with phenol compounds, such as resorcinols, the naphthols, dioxynaphthalenes and naphtholsulfonic acids. They are characterized by the property, that their afterchromed dyeings are of a more bloomy and a bluer shade, being less altered by artificial light than those of the analogous non-brominated azo dyestuffs. The monobromnaphthalene-1-diazo-2-oxid-4-sulfonic acid used for the manufacture of these new monoazo dyes can be obtained by treating with bromin at temperatures varying from 50–90° C. naphthalene-1-diazo-2-oxid-4-sulfonic acid dissolved in highly concentrated, monohydrate or weakly fuming sulfuric acid and in presence of a halogen carrier such as iodin or dissolved in chlorsulfonic acid.

The following are examples to illustrate the nature of my invention, which, however, is not limited to these examples:

Example I: 156 kilos of monobromnaphthalene-1-diazo-2-oxid-4-sulfonic acid are dissolved at 15° C. in 1500 liters of water by addition of about 35 kilos of Solvay soda, until a weakly alkaline reaction can be traced on brilliant yellow paper. Into the solution thus prepared a solution of 80 kilos of betanaphthol in 300 liters of water and 70 kilos of 33% caustic soda lye is run, and after thorough mixing, 70 kilos of Solvay soda dissolved in 300 liters of water is added, care being taken, that the temperature does not rise above 20° C. The liquor, which is at first yellow changes rapidly through green to dark blue and after a while deposits the greater part of the dyestuff in small bright blackish green crystals, a thick paste being formed. As soon as unattacked diazosulfonic acid can no longer be traced with resorcinol, the mass is diluted by addition of 1500 liters of water and heated up to 45° C. Pouring slowly to the solution thus obtained about 100 kilos of hydrochloric acid of 21° Bé. the dyestuff is precipitated in brown small needles of bronze luster, which are filtered off, pressed and dried. It forms a brown-black powder, dissolving in strong sulfuric acid with blue, in boiling water with black-violet color. On addition of alkali carbonates or ammonia the aqueous solution turns to pure blue, caustic alkalis change into blue-red. Mineral acids precipitate the dyestuff in red brown flakes. It dyes on non-mordanted wool from an acid bath brown-violet shades which on subsequent chroming turn to dark blue shades of excellent fastness to potting, milling, carbonizing and light. The dark blue dyeings obtained directly on chrome mordanted wool are distinguished by the same valuable properties.

Example II: Dissolve 40 kilos of alpha-naphthol in 300 kilos of soda lye 30% at 89° C., cool down while stirring well to 10° C. and introduce in about one hour by regular portions 82 kilos of finely powdered monobromnaphthalene-1-diazo-2-oxid-4-sulfonic acid, 15° C., being thereby not exceeded and working all the time well through the rapidly thickening mass by a strong malaxator. The combination is completed after some hours, a thick violet-black paste being formed. As soon as non-attacked bromnaphthalene-1-diazo-2-oxid-4-sulfonic acid can no more therein be traced, the product is dissolved in about 1000 liters of water and the dyestuff is precipitated in small brown black bronze shining needles at 45–50° C., by neutralizing the free alkali with about 200 kilos of hydrochloric acid of 21° Bé. Pressed and dried it forms a brown black powder, which dissolves in boiling water with violet black color, turning into pure blue on addition of alkali carbonates, while caustic alkalis change into blue red. By mineral acids the dye-stuff is precipitated in violet brown flakes; it dissolves in strong sulfuric acid with greenish blue color and dyes on non-mordanted wool from an acid bath brownish violet shades, which on subsequent chroming change to a beautiful greenish blue black of excellent fastness against potting, milling, carbonizing and light.

Similar dyeings are obtained directly on chrome mordanted wool from a boiling bath, rendered slightly acid by addition of acetic or formic acid.

In the foregoing examples the naphthols can be substituted by resorcinol, by dioxynaphthalenes and naphtholsulfonic acids, ortho-oxy dyestuffs of similar properties being thereby obtained.

The described process for the combination of the monobromnaphthalene-1-diazo-2-oxid-4-sulfonic acid may also be varied in different directions, as to temperature, quantities and strength of the employed alkali. Also suitable organic diluents as alcohol, anilin, pyridin, etc., may be employed, to accelerate in an alkaline medium the reaction between the monobromnaphthalene-1-diazo-2-oxid-4-sulfonic acid and the phenol compounds.

The reduction products of the dyestuffs are monobrom-1-amino-2-naphthol-4-sulfonic acid and an amidophenol compound.

What I claim is:

1. The process for the manufacture of dark blue monoazo dyestuffs by combining monobromnaphthalene-1-diazo-2-oxid-4-sulfonic acid with phenol compounds.

2. The process for the manufacture of dark blue monoazo dyestuffs by combining monobromnaphthalene-1-diazo-2-oxid-4-sulfonic acid with naphthol compounds.

3. As new products, the monoazo dyestuffs derived from monobromnaphthalene-1-diazo-2-oxid-4-sulfonic acid and phenol compounds, which yield violet to violet black solutions in boiling water, blue solutions in strong sulfuric acid and dye unmordanted wool from an acid bath in brownish-violet shades, which on subsequent chroming turn to dark blue.

4. As new products, the monoazo dyestuffs derived from monobromnaphthalene-1-diazo-2-oxid-4-sulfonic acid and the naphthols which dissolve in strong sulfuric acid with blue, in boiling water with violet-black color, turning to pure blue on addition of alkali carbonates and to blue-red on addition of caustic alkalis and which dye unmordanted wool from an acid bath in brownish violet shades, changing into blue black by subsequent chroming.

In testimony whereof, I have hereunto set my hand in the presence of two subscribing witnesses.

MELCHIOR BÖNIGER.

Witnesses:
WERNER HAUFFACHER,
ARNOLD ZUBER.